United States Patent
Bourque et al.

(10) Patent No.: US 9,043,148 B2
(45) Date of Patent: May 26, 2015

(54) NAVIGATION SYSTEM AND METHODS FOR GENERATING ENHANCED SEARCH RESULTS

(75) Inventors: Francis Bourque, Mundelein, IL (US); Sanjay Gupta, Lakewood, IL (US); Mark Hansen, Buffalo Grove, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 1417 days.

(21) Appl. No.: 12/579,536

(22) Filed: Oct. 15, 2009

(65) Prior Publication Data

US 2010/0168996 A1 Jul. 1, 2010

Related U.S. Application Data

(63) Continuation-in-part of application No. 12/345,439, filed on Dec. 29, 2008, now Pat. No. 8,600,577.

(51) Int. Cl.
*G01C 21/36* (2006.01)
*G08G 1/0968* (2006.01)

(52) U.S. Cl.
CPC ........ *G01C 21/3611* (2013.01); *G01C 21/3617* (2013.01); *G08G 1/096827* (2013.01); *G08G 1/096888* (2013.01)

(58) Field of Classification Search
CPC ............................. G06Q 30/02; G06Q 29/106
USPC .................................................. 701/200, 532
See application file for complete search history.

(56) References Cited

U.S. PATENT DOCUMENTS

| | | | |
|---|---|---|---|
| 5,036,471 | A | 7/1991 | Tamura et al. |
| 5,850,618 | A | 12/1998 | Suetsugu et al. |
| 5,928,305 | A | 7/1999 | Nomura |
| 5,951,622 | A | 9/1999 | Nomura |
| 6,023,655 | A | 2/2000 | Nomura |
| 6,038,508 | A | 3/2000 | Maekawa et al. |
| 6,484,094 | B1 | 11/2002 | Wako |
| 6,976,027 | B2 | 12/2005 | Cutlip |
| 7,082,365 | B2 | 7/2006 | Sheha et al. |
| 7,132,596 | B2 | 11/2006 | Nakabo et al. |
| 7,353,109 | B2 | 4/2008 | Han |
| 2004/0260466 | A1* | 12/2004 | Ichihara et al. ............... 701/209 |

(Continued)

FOREIGN PATENT DOCUMENTS

| | | |
|---|---|---|
| EP | 1467182 | 10/2004 |
| EP | 1691211 | 8/2006 |

(Continued)

OTHER PUBLICATIONS

Patel, N., Dash Express review; www.engadget.com; Mar. 27, 2008, 9 pages.

(Continued)

*Primary Examiner* — Redhwan k Mawari
*Assistant Examiner* — Rodney P King
(74) *Attorney, Agent, or Firm* — Marshall, Gerstein & Borun LLP

(57) ABSTRACT

A navigation system and various methods of using the system are described herein. Search query results are refined by the system and are prioritized based at least in part upon sub-search categories selected during the searching process. Sub-searches can be represented by graphical icons displayed on the user interface.

14 Claims, 5 Drawing Sheets

(56) References Cited

U.S. PATENT DOCUMENTS

| | | | |
|---|---|---|---|
| 2006/0122872 A1* | 6/2006 | Stevens et al. | 705/5 |
| 2006/0284767 A1 | 12/2006 | Taylor | |
| 2006/0287810 A1 | 12/2006 | Sadri et al. | |
| 2007/0010942 A1 | 1/2007 | Bill | |
| 2007/0067099 A1 | 3/2007 | Ohashi | |
| 2007/0276592 A1 | 11/2007 | Johnson et al. | |
| 2007/0299599 A1 | 12/2007 | Letchner | |
| 2008/0005067 A1* | 1/2008 | Dumais et al. | 707/3 |
| 2008/0077319 A1 | 3/2008 | Kato et al. | |
| 2008/0133130 A1 | 6/2008 | Okamoto | |
| 2009/0241061 A1 | 9/2009 | Asai et al. | |
| 2010/0168994 A1 | 7/2010 | Bourque et al. | |

FOREIGN PATENT DOCUMENTS

| | | | |
|---|---|---|---|
| EP | 1990789 | A1 | 11/2008 |
| EP | 2000775 | | 12/2008 |
| EP | 2063226 | A2 | 5/2009 |

OTHER PUBLICATIONS

PCT/US2009/066565; PCT Notification of Transmittal of the International Search Report and the Written Opinion of the ISR; mailed Mar. 22, 2010; 14 pages.

Dash Express (http://www.amazon.com/Dash-Express-Internet-Connected-Portable-Navigator/dp/B0014CIBWC); http://web.archive.org/web/20081227141347/http://www.amazon.com/Dash-Express-Internet-Connected-Portable-Navigator/dp/B0014CIBWC; Dec. 7, 2008 Snapshot; 9 pages.

Google Search; http://web.archive.org/web/20081228065450/http://www.google.com; Dec. 28, 2008 Snapshot; 1 page.

Microsoft Live (http://www8.garmin.com/traffice/msn/index.jsp); http://web.archive.org/web/20081217025107/http://www8.garmin.com/traffic/msn/index.jsp; Dec. 17, 2008 Snapshot; 2 pages.

Microsoft Windows Desktop Search; http://web.archive.org/web/20080908104536/http://www.microsoft.com/windows/products/winfamily/desktopsearch/deafult.mspx; Sep. 8, 2008 Snapshot; 1 page.

Yahoo Desktop Search—X1 (http://www.x1.com/); http://web.archive.org/web/20080523070115/http://www.x1.com; May 23, 2008 Snapshot; 1 page.

Yahoo! Search; http://web.archive.org/web/200811227183913/http://yahoo.com; Dec. 27, 2008 Snapshot; 1 pg.

Patent Cooperation Treaty "Notification of Transmittal of the International Search Report and the Written Opinion of the International Searching Authority, or the Declaration", Dec. 3, 2010, pp. 1-13, PCT/US2010/048559, European Patent Office.

United States patent and trademark office, "Non-Final Rejection" for U.S. Appl. No. 12/345,439 Apr. 18, 2011, 12 pages.

* cited by examiner

NAVIGATION SYSTEM AND METHODS FOR GENERATING ENHANCED SEARCH RESULTS

CROSS REFERENCE TO RELATED APPLICATIONS

The present application claims priority to U.S. patent application Ser. No. 12/345,439, filed on Dec. 29, 2008, titled Navigation System and Methods for Generating Enhanced Search Results, which is hereby incorporated by reference in its entirety herein.

FIELD OF THE INVENTION

The present invention relates to systems and methods for guided navigation. More particularly, the present invention relates to navigation systems and methods for generating enhanced search query results when operating navigation systems.

BACKGROUND OF THE INVENTION

Navigation systems are known for identifying and displaying a desired geographic location, as illustrated on a map, as well as computing a route from a current location to a desired location. These systems are commonly found on automotive vehicles as well as encompassed within hand-held devices. It is often the case that navigation systems provide information relating to points of interest (POI), such as shopping, food, and business related locations. However, voluminous search query results are typically generated, which is inefficient and often ineffective for providing information relating to POIs. It would be advantageous for a navigation system to efficiently provide enhanced search query results for more effective searching. It would be further advantageous for a navigation system to provide sub-searching capabilities for refining search results and therefore providing more effective searching.

SUMMARY OF THE INVENTION

In one aspect of the invention, a navigation system is provided. The system includes a graphical user interface configured for receiving and displaying travel related data, a database containing geographic related data and a search engine. The search engine is configured to perform a process for providing search query results. The process includes initiating a search query, generating a list of results based upon the search query and prioritizing the results. Additional steps include displaying the list in the interface based at least in part upon the prioritizing and providing sub-search categories for focusing the prioritized results.

In another aspect of the invention, a method for conveying enhanced search query results with a navigation system is provided. The steps include initiating a search query based at least in part upon a final destination, accessing a database configured for storing geographic information and generating a list of destination results based at least in part upon the search query. Additional steps include prioritizing the list based at least in part upon travel related information, displaying the prioritized results on a navigation system graphical interface and providing pre-determined sub-searching categories for narrowing the prioritized list of results based at least in part upon one or more predetermined categories.

In yet another aspect of the invention, a navigation system that facilitates conveying enhanced query results is provided. The system includes an interface component that receives a query corresponding to geographical destination and a visual component that employs a search result based at least in part upon the query. The search results are prioritized based upon travel related data and a sub-search category.

In yet another aspect of the invention, a method of conveying search query results is provided. The method includes initiating a search query based at least in part upon a final destination, accessing a database, generating a list of intermediary destination results based at least in part upon the search query and displaying the list on a graphical interface. Additional steps include, selecting at least one of a sub-search category icons displayed on the graphical interface and displaying a list of destination results based at least in part upon the sub-search category icon selected.

DETAILED DESCRIPTION

Figure 1:
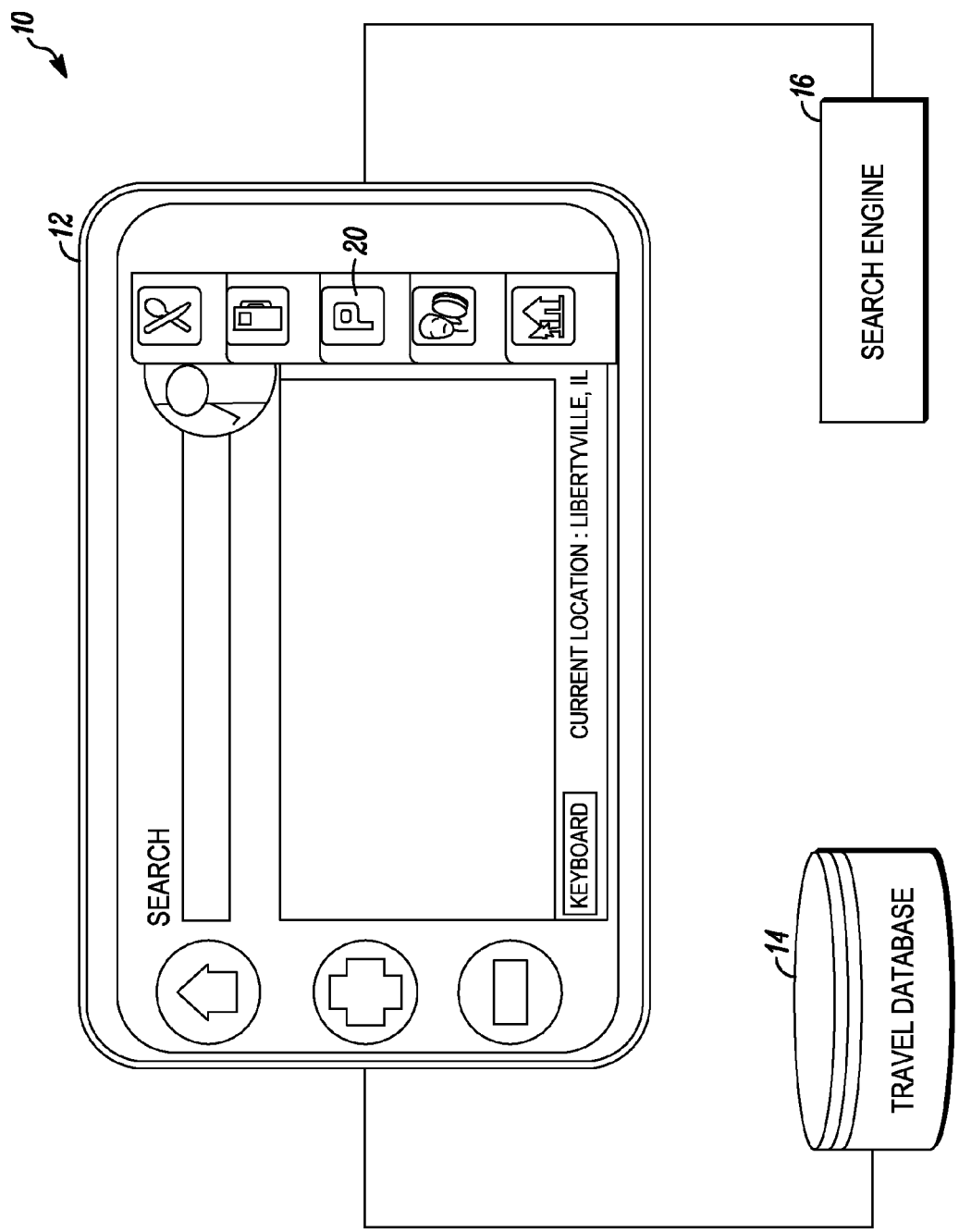
FIG. 1 is a block diagram representing a navigation system according to at least one embodiment of the present invention.

Referring to FIG. 1, a block diagram of an exemplary navigation system 10 is provided. The navigation system 10 includes a user interface 12, a travel database 14, and a search engine 16. The system 10 can be a smart phone, mobile computing device, affixed within a vehicle, or another suitable configuration. The interface 12 has a graphic display 18 and manual data entry keypad 20, which is generally known in the art and suitable for the present system 10. Alternatively, the interface 12 can have a touch screen, QWERTY style keypad, wireless data entry, or voice activation and recognition. The travel database 14 is a relational database accessed by the search engine 16. The travel database 14 includes travel related information, including, but not limited to maps, destinations, attractions, historical travel information and other travel related data. Data provided within the database 14 is utilized for generating travel routes and providing suggested travel destinations based at least in part upon a user's search query and travel related data described further below. The search engine 16 is a processing device that is configured to execute computer executable code. Alternatively, the search engine 16 is a microprocessor.

The database 14 includes information relating to geographical roadways and routes. A variety of commercially available databases containing map and atlas related information are suitable. It is contemplated that the database 14 includes additional information that is relevant to the user and previously performed search queries. By example, additional information can include sociological data, such as neighborhood crime rates, ethnicity demographics and average household incomes, and industrial data, such as type of businesses, shopping related data, and potentially hazardous industrial locations. Additionally, the generation of sociological and industrial profiles for neighborhoods or geographic regions is contemplated. Values assigned to various data within each profile can affect the prioritization and ranking of search query results. Utilizing the database 14, the search engine 16 can perform a reverse address search to identify businesses and other points of interest (POI) within close proximity of the current location. The interface 12 can be programmed to prompt a user to identify the current location by the POI visited. If a user identifies one or more POIs the information is updated within the database 14. Alternatively, results having a higher ranking than the result chosen by a user are also recorded in the database 14 and can be assigned a lower ranking if the same search query is subsequently performed.

The database 14 can also include information relating to previous travel and other behavior selections and circumstances encountered by one or more users in the past. Such information can be conceptually identified as separate, including geographic travel related historical data and contextual travel related historical data. The contextual travel related data includes information selected from the group including frequency of destination visits, search query time, time-of-day associated with previous search queries, current directional travel, weather conditions, traffic conditions, current time of day and frequency of current route. Contextual travel related historical data can also include information stored within the database 14 that represents associations and/or inferences extrapolated from historical and non-historical related data. The historical database can include information selected from the group comprising previous search queries, prior travel routes, prior locations visited, type of prior location visited and deviation distance from route for previously chosen locations. Additionally, the database 14 can include previous destination specific information, which can affect the ranking and prioritization of that particular result. By example, the operating hours of a previously visited business is stored in the database 14. If the search query is performed outside of the business' operating hours, or the estimated time of travel to the destination added to query time would be outside of the operating hours, then the destination is given a lower rank or removed from the results completely.

Travel database 14 data can also be harvested from a mobile device, such as cell phones, smart phones, PDAs, computers, and other electronic data storing devices. A wireless connection, such as Bluetooth, or wired connection provides access to information for use in prioritizing search queries. By example, previously dialed numbers and frequency of calls made and received can be stored in the database 14 and used for prioritizing search results. Additionally, location and travel information from calls made or received from a mobile phone is contemplated. Higher call frequency associated with a particular number and location can affect the prioritization by assigning a higher rank to results in closer proximity to that particular location. The database 14 can generate associations between different types of data and generate inferences, which can affect prioritization of search results, based upon the associations. By example, a search for "Motorola Phone" resulted in a user traveling to "Best Buy". If the same search is performed at a subsequent time, results similar to "Best Buy" will be prioritized based upon the inference made from the previous search. It is contemplated that a mobile device, such as a Bluetooth enabled cell phone, can be used to identify a user, which the system 10 associates with stored historical data. Alternatively, a user can input their identity manually through the interface 12.

Figure 2:
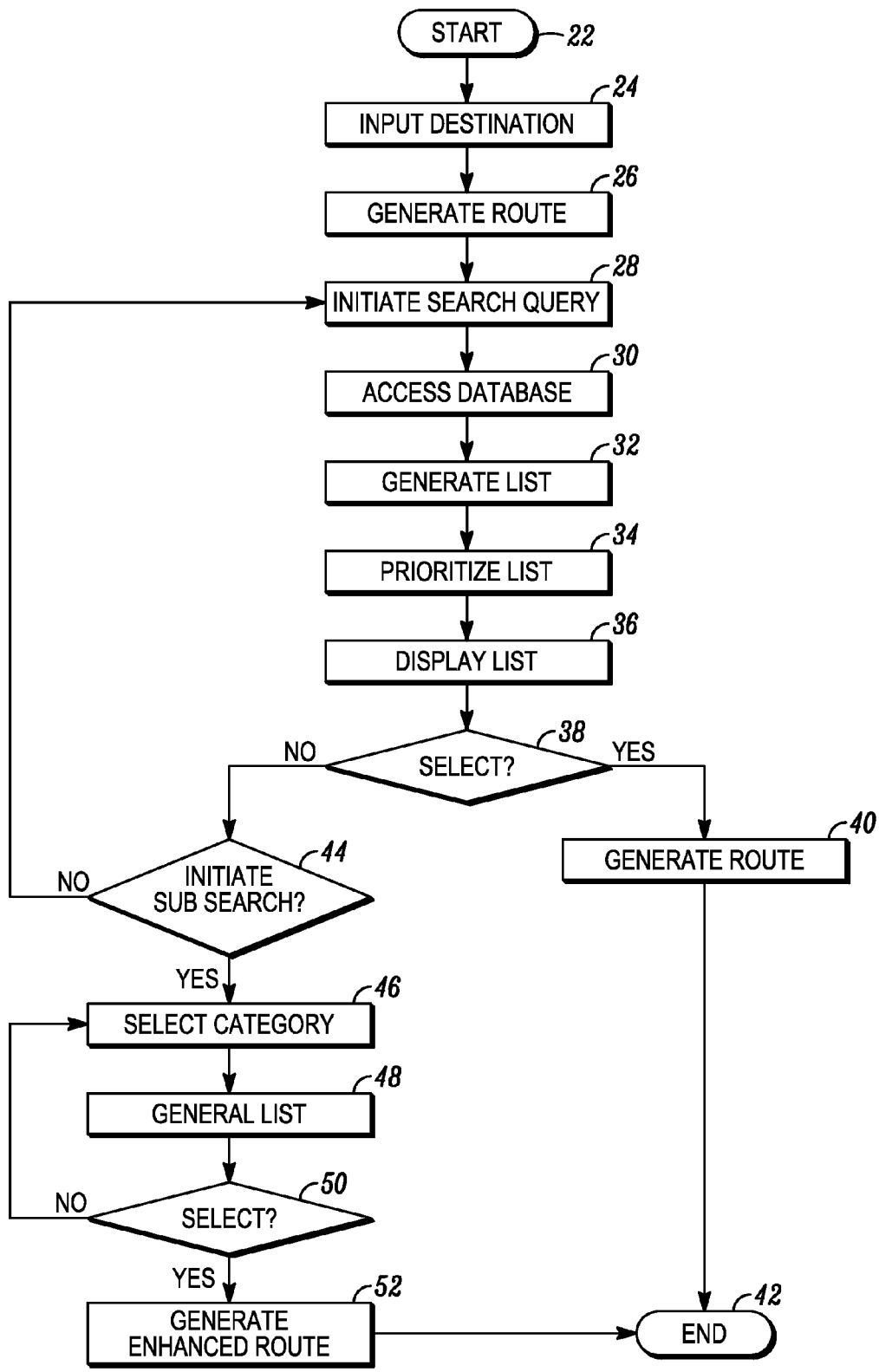
FIG. 2 is a flow diagram representing a process for generating search query results according to at least one embodiment of the present invention.

Now referring to FIG. 2 an exemplary process is provided for execution of enhanced sub-search queries. The system 10 is initiated at step 22 and a user provides a desired final destination to the interface 12 at step 24. A route from the present location to the final destination is generated at step 26, based at least in part upon information from the travel database 14. At step 28, a destination search query is initiated by a user. Based upon the search query, the system 10 accesses the database 14 at step 30. Alternatively, the system 10 can access more than one database concurrently or in sequence and/or on a repeated basis for generating a list of POIs. After accessing the database at step 30, a list of intermediary search results is generated at step 32. The generated list is then prioritized at step 34 and displayed at step 36. A decision whether to select one of the intermediary destinations in the list is performed at step 38. If an intermediary destination is chosen at step 38, then an intermediary route is generated at step 38 and the process terminates at step 42. In the event that a selection is not made, a determination whether to initiate a sub-search occurs at step 44. If a sub-search is not initiated, then the process reverts to step 28. If a sub-search is initiated then a sub-search category is selected at step 46 and a POI/destination list is generated at step 48 based at least in part upon the particular category selected. If a POI/destination is selected from the list, then an enhanced route, based at least in part upon the category selection, is generated at step 52 and the process is terminated at step 42. In the event that a POI/destination is not selected at step 50, then the process reverts to step 46. If the process reverts to step 46 and a different category is selected, the new list is generated based at least in part upon the second category selected and not based upon the first category selection.

Employing sub-search categories is a unique method of refining navigation system search queries that provide even more pertinent results for users based upon their inputs, desired travel and POI destinations. After a search has been performed, sub-search categories are made available as input buttons 20 on the display 18. Alternatively, categories can be provided in a variety of known methods through the display 18.

Now referring to FIGS. 3-6, exemplary interfaces 12 are provided. As an example, the first exemplary interface (FIG. 3) represents a search for "Libertyville, Ill." and all restaurants within a 10 mile radius. As indicated, there are 21 results that are listed on the interface. After selecting Libertyville, Ill. as the current location the restaurant category icon 54 was selected, resulting in the search results shown. The exemplary interface 12 includes a restaurant icon 54, a fuel source icon 56, a parking location icon 58, and arts and entertainment icon 60 and a lodging icon 62. The restaurant icon 54, when selected, provides a sub-search that refines search results and presents a list of restaurants and eating establishments within a default radius. The default radius can be changed based upon a user's preferences. Similarly, the parking icon 58 provides a refined search, which focuses the search results based upon parking locations in close proximity to the search selection, or all of the results in the search list. The arts and entertainment icon 60 provides a refined sub-search, when selected, for POIs that pertain to performing arts, entertainment and traditional art POIs. Pre-determined icons can be associated with various search results such that the search list includes one or more icons displayed along side, or in proximity to, the search result in the list.

Additionally, the interface 12 includes a home selector 64, a scroll up selector 66 and a scroll down selector 68. The home selector 64 returns to a main or home screen when selected.

The scroll up selector 66 and the scroll down selector 68 allow a user to scroll up and down, respectively, through the list of search results.

Figure 3:
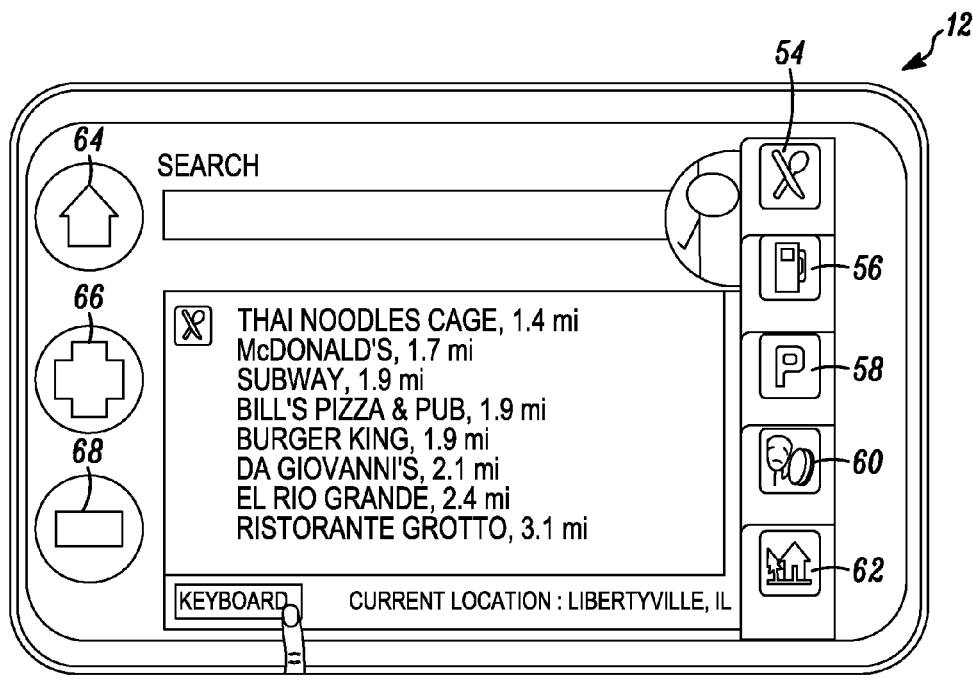
FIG. 3 is an exemplary system graphical interface according to at least one embodiment of the present invention.
Figure 4:
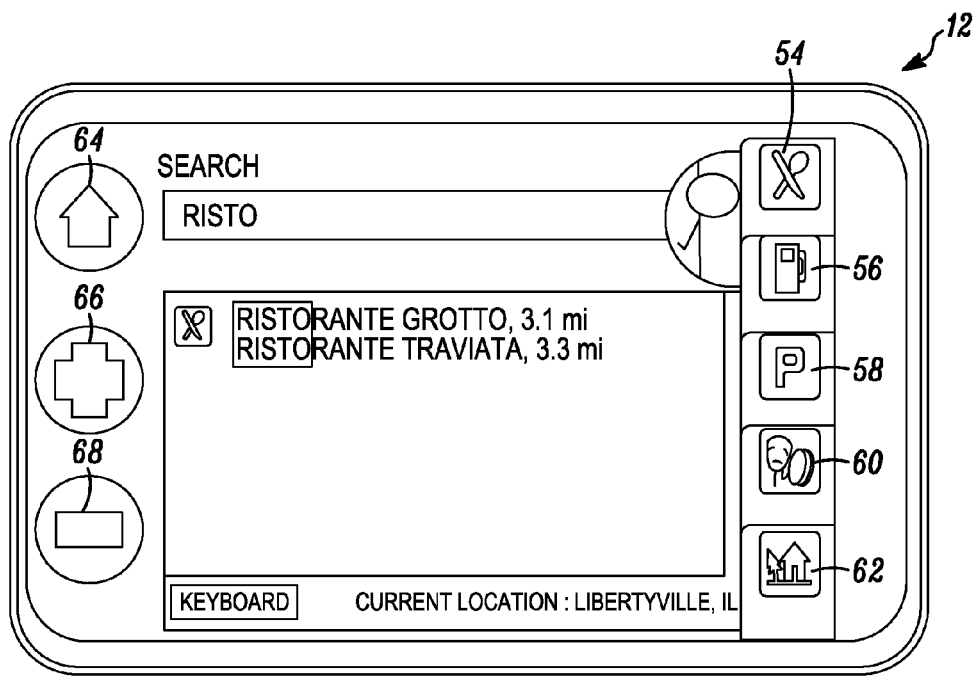
FIG. 4 is an exemplary system graphical interface according to at least one embodiment of the present invention.

Based upon the search list provided in FIG. 3, an additional keyword search is performed for the term "Risto" (See FIG. 4). Of the 21 restaurants in the search list, only 2 meet the criteria searched. This refinement step enables a user to further focus and refine search queries to more effectively and quickly find the most pertinent search results. After a user finds and selects the preferred search result, the system generates a navigational route to the selected search result.

Figure 5:
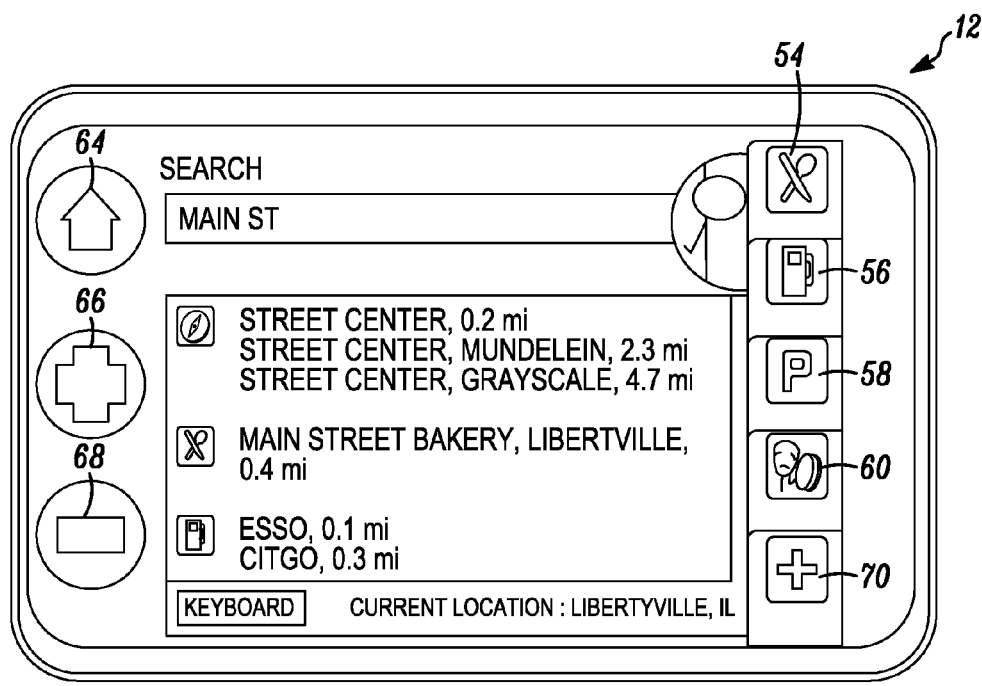
FIG. 5 is an exemplary system graphical interface according to at least one embodiment of the present invention.
Figure 6:
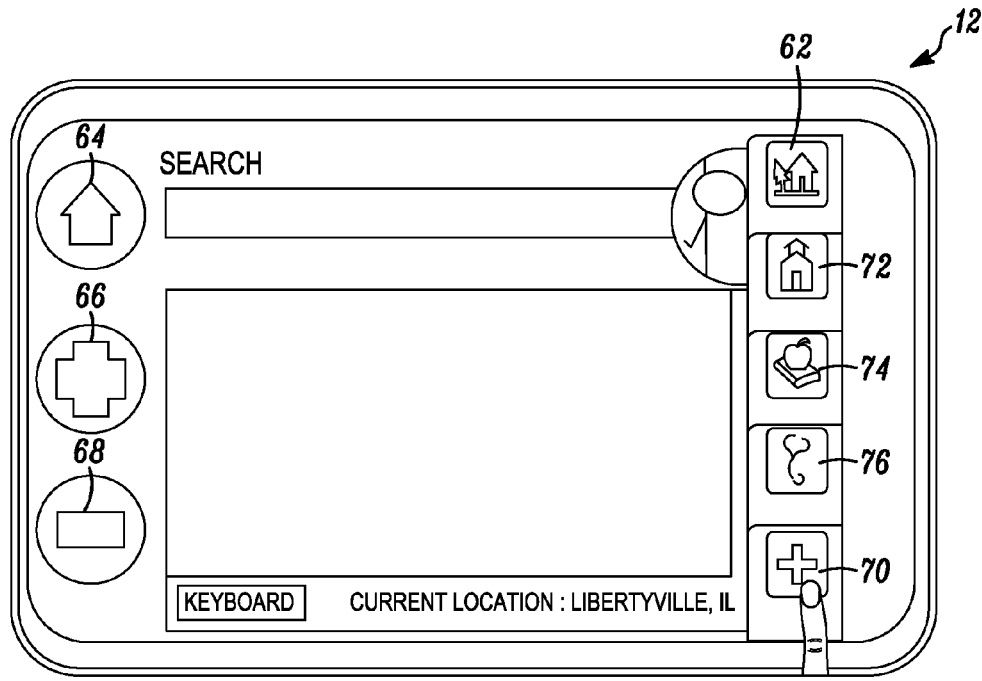
FIG. 6 is an exemplary system graphical interface according to at least one embodiment of the present invention.

Referring to FIG. 5, a query including the search term "Main St" was performed. The interface 12 includes the search results with a representative icon to the left of each search result in the list. The icon is representative of the category within which the search result is associated. In the present exemplary interface 12 a next list icon 70 is provided, which allows a user to view additional category icons for sub-search refinement. Referring to FIG. 6, additional icons are provided, including a religious worship icon 72, an educational institution icon 74 and a medical services icon 76. Each of these icons provided added refinement for search queries.

Search categories include any named element within the travel database 14. By example, named categories can include streets, subdivisions, neighborhoods, parks, lakes, rivers and alternative categories. Additionally, categories defined in the taxonomy as POIs in the database 14 are included. Furthermore, meta-categories that are encompassing multiple existing categories can be searched. By example, "Asian Food" is a meta-category that can include Chinese, Japanese and Thai food.

It is contemplated that the navigation system 10 search refinement can be obtained in several different processes. By example, an alternative method of search refinement includes obtaining focused or refined search results after sub-searching a category or multiple categories. The combination of multiple categories, by example, can be based upon data elements within the database 14 that have a logical relationship or belong to more than one category. Alternatively, the relationship between data elements can be spatial, such as the physical proximity between two destinations. A relevancy factor can be applied to the destinations based upon their relative proximity.

In an alternative embodiment, a user can conduct a sub-search through pre-defined or user-selected keywords. The system 10 includes a look-up table as part of the database 14 that associates the keyword with a particular category or meta-category search. This is particularly useful as users often loosely mix the content of the search criteria, such as "Wine & Liquor Store" or "Bread & Bakery". The search results can include both direct matches as well as substitution matches. Direct matches have a higher priority, and therefore substitution matches by default, which can be changed, are shown when there are a limited number of direct matches.

Figure 7:
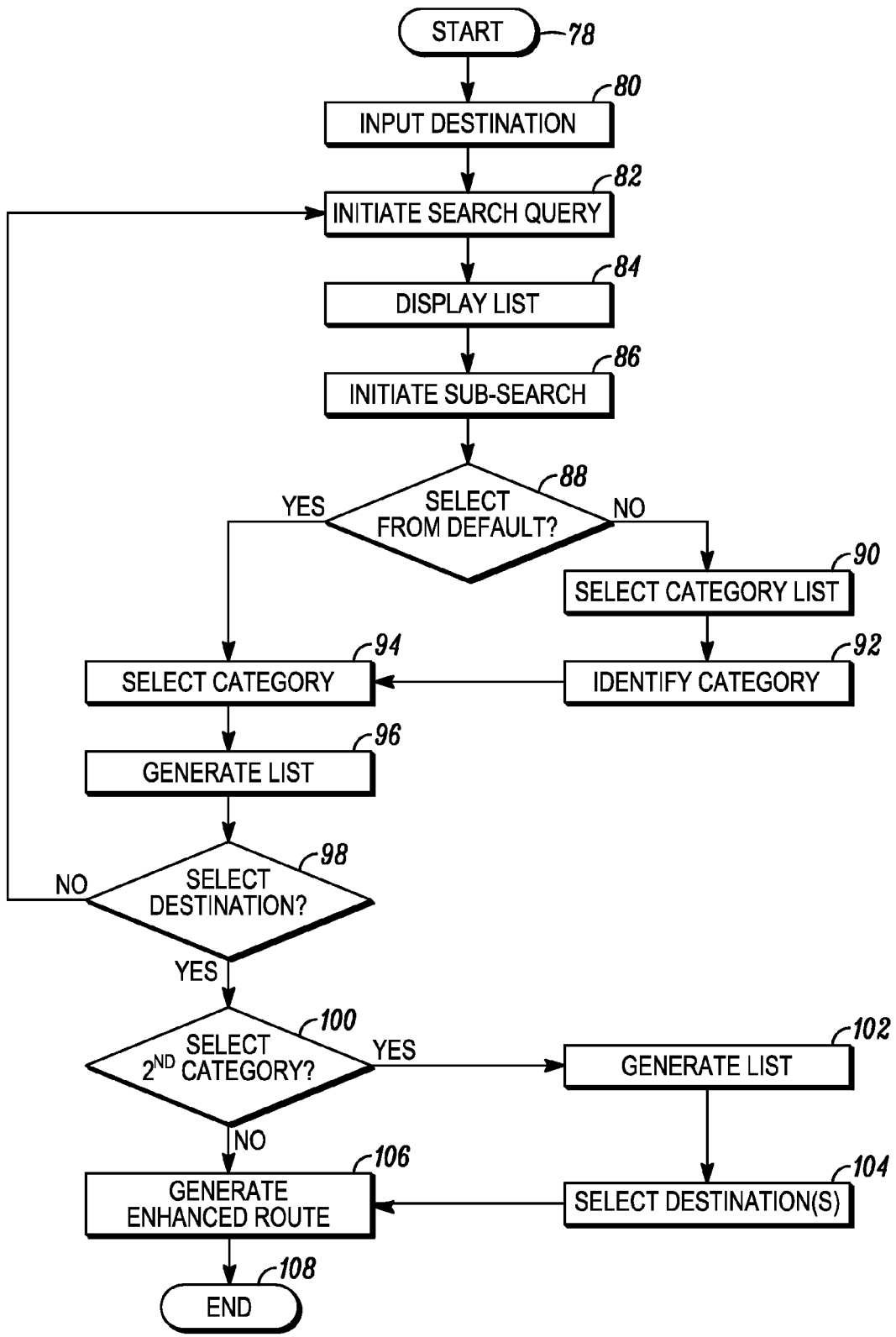
FIG. 7 is a flow diagram representing a process for prioritizing search query results according to at least one embodiment of the present invention.

Referring to FIG. 7, an alternative embodiment of the process is provided. The method is initiated at step 78 and a user provides a desired final destination to the interface 12 at step 80. The search query is initiated at step 82. A search query list is displayed on the interface 12 at step 84. A sub-search is then initiated at step 86. A decision whether to select a search category from the default list is performed at step 88. If a default category is not selected, then the next list icon 70 is selected at step 90 and a category from an additional list is identified at step 92. A sub-search category is selected at step 94. In the event that a default category is desired, then the category is selected at step 94. A list of refined search query results is generated at step 96. A determination is made at step 98 whether to select one of the destinations in the list. If a result is not selected, then the process reverts to step 82. In the event that a result is selected then a determination is made whether to further refine the search query list with a second category at step 100. If a second category is selected, then a new list is generated at step 102 and the user selects one or more destinations from the revised list at step 104. An enhanced route is generated at step 106, based at least in part upon the sub-searching categories selected. The process terminates at step 108.

It is contemplated that more than two sub-search categories can be selected for searching purposes. A user can utilize the sub-searching categories to highly refine a search query based upon particular and specific searching criteria and desired results. Alternatively, mixed categories can be predefined or created on the fly by a user and/or the system 10. As an example, a mixed category such as "Gas Station" and "Food" could be automatically generated by the system 10 based upon a previous proximity search for a gas station and restaurant.

The final destination route can be analyzed based upon contextual information, such as the approximate distance or estimated length of time and type of driving (By example, Interstate, County Highway, or City Roadway). Query results are prioritized based at least in part upon the route context and sub-search categories selected. By example, a longer route on the Interstate can prioritize fast-food restaurants located proximal to the Interstate higher than a five-star restaurant located distal to the Interstate. If a lodging sub-search category was selected, then the results would be further prioritized based upon lodging proximity and predetermined lodging specifics.

An intermediary destination is a location other than a location at the time of generating the search and the final destination. The intermediary location can be located proximal or distal to the final destination route. Once an intermediary location is selected and a route is generated, the final destination route is recalculated based upon the intermediary location. Traffic information, road construction, preferred routes, and alternative roadway information can be utilized in generating prioritized route. A user can optionally select alternative methods of transportation, such as walking or bicycle travel, which can alter the route accordingly.

Alternatively, a method of conveying search query results includes initiating a search query based at least in part upon a final destination. The final destination is selected by a user. After selecting the target or final destination a travel database is accessed. The database includes historical travel related information and contextual travel related information. A list of intermediary destination results is generated based at least in part upon the search query, historical travel related information, contextual travel related information and sub-searching categories. After the intermediary results have been generated they are displayed within a graphical interface, such as one provided by a mobile navigation system. The user can select any of the intermediary destinations, which are distinct from a current location and the final destination. The database can be accessed remotely, such as through a GPS or other wireless method, or the database can be integral to the navigation system. Databases integral to a navigation device can be regularly updated through wired or wireless communication with a supplied database (not shown). The database 14 information is logically associated with the respective sub-search categories.

In an alternative embodiment, the system 10 allows a user to provide a search query to the interface 12 representing a combination of search criteria. The query is proofed by the search engine 16 for typos or misspellings, and alternative keywords are suggested if a discrepancy is discovered. The combined search query can be compared with more than one database sequentially or concurrently. A list of POIs are provided based in part upon the keywords selected, proximity metrics to a final destination and the structure associated with the databases. The search query can be referred to as an unstructured search query, which provides flexibility and greater ease of use.

To further consider the system and methods described herein, several search query examples are provided. These are merely exemplary and not intended to limit the scope of the claims provided herein. It is further contemplated that the invention can encompass a variety of other scenarios.

Search Query Example 1

At approximately 6:00 A.M. on a Wednesday during the winter a user enters a vehicle in downtown Chicago, Ill. and enters a search query including the keyword "Fast food" and selects an option for close proximity to a final destination, which is identified as "work". The search engine identifies the search query and compares the query to historical query information contained within one or more databases. After the comparison is complete the search engine generates a prioritized list of fast food destination within close proximity to the user's preferred route to work. "Dunkin Donuts" is at the top of the list, followed by several other fast food restaurants, as well as additional Dunkin Donut locations. The user presses the sub-searching icon that represents available parking in close proximity to the query results. A new list is generated that refines the list based upon available parking. The search engine also identified the user's contextual information, including location upon query initiation, time of day, day of week and season. After comparing the database with the user's query and contextual information, it was identified that the user had traveled to Dunkin Donuts 12 previous times during the work week, at approximately 6:00 A.M., during the winter while on his way to work after initiating the same or similar query. The user had previously traveled to "Starbucks" only 3 times, and therefore this location had been assigned a lower priority value. In the immediate case, a Dunkin Donut location without available parking was placed towards the bottom of the list, even though it was closer to the desired route. The user selects a Dunkin Donut location that is closest to the desired route and that has convenient available parking in close proximity.

Search Query Example 2

A search is initiated containing the keywords "Restaurants in Chicago." After initiating the query a database is accessed and a comparison of the keywords is performed with respect to information contained within a database having historical travel data. A list of restaurants in Chicago is provided ranked by the frequency of visits to a particular restaurant, the day of week and time of day associated with the current query and prior visits to the results. Traffic data can be collected based upon the time of day and day of week to minimize the travel time to a location, and the list can be prioritized based upon the estimated travel time. Combination of historical, contextual and traffic information relating to a particular search query can provide a list of enhanced search results. The search results represent a list of potential intermediary destinations. The user selects an arts and entertainment icon to further refine the list. In the present case, performing arts and entertainment venues in close proximity to the restaurants in the search list are provided. A user is then able to select a performing arts venue that is conveniently located in close proximity to the Chicago restaurant they desire. It is conceived that an initial and final destination are one in the same, while the intermediary destination is a target destination within a round-trip travel sequence.

Search Query Example 3

A search query is initiated for a brand of navigation systems, such as "Motorola." The search is performed and a generated list of possible businesses offering Motorola® navigation systems for sale is provided. The businesses can include electronic stores, department stores, travel-specific businesses, and alternative locations that carry Motorola® products. Businesses are prioritized based upon frequency of visit, location proximity, and other contextual and historical information. Searching for a preferred brand, such as Motorola® navigation systems, will return businesses that are associated with selling and servicing the preferred product brand. A user can further refine the search results based upon the need to obtain fuel for their vehicle. A fuel source icon is selected, which focuses the results list based upon fuel sources that are in close proximity to the user's current location and that provide the most efficient route to the search results on the list.

It is specifically intended that the present invention not be limited to the embodiments and illustrations contained herein, but rather that the present invention also include modified forms of those embodiments including portions of the embodiments and combinations of elements of different embodiments as come within the scope of the following claims.

We claim:

1. A navigation system comprising:
   a graphical user interface configured for receiving input and displaying content;
   a database containing travel related data;
   a search engine configured to perform a process for providing search query results, the process comprising the steps of:
   receiving, via the graphical user interface, an input for a destination location;
   initiating a search query based on the destination location,
   identifying, from the travel related data in the database, a list of results based upon the search query,
   identifying a set of sub-search categories associated with the list of results,
   displaying (i) the list of results in the graphical user interface and (ii) a set of sub-search icons corresponding to the set of sub-search categories,
   receiving, via the graphical user interface, a selection of one of the set of sub-search icons,
   identifying a refined list of results according to the selection of the one of the set of sub-search icons, and
   displaying the refined list of results in the graphical user interface, wherein the set of sub-search icons represent a set of pre-determined categories selected from the group comprising: fuel filling station, restaurant, parking, arts and entertainment, lodging, religious worship structure, educational structure, medical services business, keywords and meta-categories.

2. The navigation system according to claim 1, wherein the list of results is prioritized based at least in part upon one or more previous travel and query selections.

3. The navigation system according to claim 1, wherein the set of pre-determined categories, when selected, narrow the list of results based at least in part upon a desired destination.

4. The navigation system according to claim 1, wherein the set of sub-search icons graphically respectively represent the pre-determined categories for which they are associated.

5. The navigation system of claim 1, wherein the navigation system is a mobile device, wherein a point of interest (POI) is selected from the refined list of results, and wherein a route to the selected POI is generated.

6. The navigation system according to claim 5, wherein the travel related data includes information selected from the group comprising: frequency of destination visits, search query time, time-of-day associated with previous search queries, current directional travel, and frequency of the route.

7. For use in conjunction with a navigation system, a method for conveying enhanced search query results comprising the steps of:
- initiating a search query, by accessing a database storing geographic related information, based at least in part upon a final destination;
- identifying a list of destination results based at least in part upon the search query;
- identifying a set of sub-search categories associated with the list of destination results;
- displaying, on a navigation systems graphical interface, (i) the list of destination results and (ii) a set of sub-search icons corresponding to the set of sub-search categories;
- receiving, via the navigation systems graphical interface, a selection of one of the set of sub-search icons;
- identifying a refined list of results according to the selection of one of the set of sub-search icons;
- displaying the refined list of results in the navigation systems graphical interface;
- receiving a selection of a point of interest (POI) from the refined list of results; and
- generating a route to the POI, wherein the set of sub-search categories are selected from the group comprising: fuel filling station, restaurant, parking, arts and entertainment, lodging, religious worship structure, educational structure, and medical services business.

8. The method according to claim 7, further comprising:
prioritizing the list of destination results at least in part upon a frequency of visits associated with the destination results.

9. The method according to claim 7, further comprising:
prioritizing the list of destination results at least in part by a distance associated with the final destination.

10. The method according to claim 7, wherein the geographic related information includes roadway information.

11. A method of conveying search query results comprising the steps of:
- initiating a search query based at least in part upon a final destination;
- identifying, from a database, a list of intermediary destination results based at least in part upon the search query;
- displaying the list of intermediary destination results in a graphical interface;
- identifying a set of sub-search categories associated with the list of intermediary destination results;
- displaying, in the graphical interface, (i) the list of intermediary destination results and (ii) a set of sub-search icons corresponding to the set of sub-search categories;
- receiving, via the graphical interface, a selection of one of the set of sub-search icons;
- initiating a sub-search based at least in part upon the selection of the one of the set of sub-search icons to identify a list of destination results; and
- displaying the list of destination results in the geographical interface, wherein the set of sub-search categories are selected from the group comprising: fuel filling station, restaurant, parking, arts and entertainment, lodging, religious worship structure, educational structure, and medical services business.

12. The method according to claim 11, wherein the graphical interface is a navigation system.

13. The method according to claim 11, wherein a further comprising:
selecting the set of sub-search categories before initiating the search query.

14. The method according to claim 11, wherein the set of sub-search categories correspond to a default set of sub-search categories.

* * * * *